US009182615B2

(12) United States Patent
Greinert et al.

(10) Patent No.: US 9,182,615 B2
(45) Date of Patent: Nov. 10, 2015

(54) PARTICLES FOR ELECTROPHORETIC DISPLAYS

(75) Inventors: Nils Greinert, Neumuenster (DE); Marc Uerdingen, Lohmar (DE); Ludger Beylage, Reinheim (DE); Nikolai (Mykola) Ignatyev, Duisburg (DE); Jonathan Henry Wilson, Southampton (GB); Mark John Goulding, Ringwood (GB); Roger Kemp, Winchester (GB); Ashley Nathan Smith, Southampton (GB); Paul Bartlett, Bath (GB); Peter Barthen, Rheinberg (DE); Walter Frank, Wuppertal (DE); Rodrigo Sanchez Garcia, Federal District (MX)

(73) Assignees: Merck Patent GmbH (DE); The University of Bristol (GB)

( * ) Notice: Subject to any disclaimer, the term of this patent is extended or adjusted under 35 U.S.C. 154(b) by 0 days.

(21) Appl. No.: 13/988,566

(22) PCT Filed: Nov. 25, 2011

(86) PCT No.: PCT/EP2011/005936
§ 371 (c)(1),
(2), (4) Date: May 21, 2013

(87) PCT Pub. No.: WO2012/072218
PCT Pub. Date: Jun. 7, 2012

(65) Prior Publication Data
US 2013/0244035 A1   Sep. 19, 2013

(30) Foreign Application Priority Data
Nov. 30, 2010   (EP) .................................... 10015121

(51) Int. Cl.
*C08F 20/10*   (2006.01)
*G02F 1/00*   (2006.01)
*G02F 1/167*   (2006.01)
*C08F 220/14*   (2006.01)

(52) U.S. Cl.
CPC .............. *G02F 1/0009* (2013.01); *C08F 20/10* (2013.01); *G02F 1/167* (2013.01); *C08F 220/14* (2013.01); *G02F 2001/1678* (2013.01); *Y10T 428/2982* (2015.01)

(58) Field of Classification Search
CPC .................. G02F 1/0009; G02F 1/167; G02F 2001/1678; C08F 20/10; C08F 220/14
USPC ........ 428/402, 403, 407; 427/212; 521/28, 38
See application file for complete search history.

(56) References Cited

U.S. PATENT DOCUMENTS

| 5,380,362 A | 1/1995 | Schubert |
|---|---|---|
| 5,403,518 A | 4/1995 | Schubert |
| 5,783,614 A | 7/1998 | Chen et al. |
| 6,194,488 B1 | 2/2001 | Chen et al. |
| 6,956,690 B2 | 10/2005 | Yu et al. |
| 7,038,655 B2 | 5/2006 | Herb et al. |
| 7,052,766 B2 | 5/2006 | Zang et al. |
| 7,110,162 B2 | 9/2006 | Wu et al. |
| 7,170,670 B2 | 1/2007 | Webber |
| 7,226,550 B2 | 6/2007 | Hou et al. |
| 7,236,290 B1 | 6/2007 | Zhang et al. |
| 7,247,379 B2 | 7/2007 | Pullen et al. |
| 7,277,218 B2 | 10/2007 | Hwang et al. |
| 7,304,634 B2 | 12/2007 | Albert et al. |
| 2002/0090547 A1 | 7/2002 | Schmidt et al. |
| 2002/0160261 A1 | 10/2002 | Schmidt et al. |
| 2005/0018273 A1 | 1/2005 | Honeyman et al. |
| 2006/0222584 A1 | 10/2006 | Welz-Biermann et al. |
| 2007/0128352 A1 | 6/2007 | Honeyman et al. |
| 2007/0128515 A1 | 6/2007 | Ignatyev et al. |
| 2007/0268244 A1 | 11/2007 | Chopra et al. |

FOREIGN PATENT DOCUMENTS

| EP | 1205480 A2 | | 5/2002 |
|---|---|---|---|
| EP | 1229038 A1 | | 8/2002 |
| GB | 2438436 A | | 11/2007 |
| WF | WO2010/089058 | * | 8/2010 |
| WO | WO-99/10767 A1 | | 3/1999 |
| WO | WO-2004072089 A1 | | 8/2004 |
| WO | WO-2005017046 A2 | | 2/2005 |
| WO | WO-2005049555 A1 | | 6/2005 |
| WO | WO2009/100803 | * | 8/2009 |
| WO | WO-2009100803 A2 | | 8/2009 |
| WO | WO-2010050949 A1 | | 5/2010 |
| WO | WO2010/089059 | * | 8/2010 |
| WO | WO-2010089057 A2 | | 8/2010 |
| WO | WO-2010089058 A1 | | 8/2010 |
| WO | WO-2010089059 A1 | | 8/2010 |
| WO | WO-2010089060 A2 | | 8/2010 |

OTHER PUBLICATIONS

Sheldon, Roger, "Catalytic Reactions in Ionic Liquids", Chem. Commun., (2001), pp. 2399-2407.
Earle, Martyn J., et al., "Ionic Liquids. Green Solvents for the Future", Pure Appl. Chem., vol. 72, No. 7, (2000), pp. 1391-1398.
Wasserscheid, Peter, et al., "Ionische Fluessigkeiten—neue ,, Loesungen" fuer die Uebergangsmetallkatalyse, Angew. Chem., vol. 112, (2000), pp. 3926-3945.
Welton, Thomas, "Room-Temperature Ionic Liquids. Solvents for Synthesis and Catalysis", Chem. Rev., vol. 99, (1999), pp. 2071-2083.
Hagiwara, Rika, et al., "Room Temperature Ionic Liquids of Alkylimidazolium Cations and Fluoroanions", Journal of Fluorine Chemistry, vol. 105, (2000), pp. 221-227.
International Search Report for PCT/EP2011/005936 mailed Apr. 12, 2012.

* cited by examiner

*Primary Examiner* — Leszek Kiliman
(74) *Attorney, Agent, or Firm* — Drinker Biddle & Reath LLP

(57) ABSTRACT

This invention relates to polymer particles with surface functionality for charge retention, a process for their preparation, the use of these particles for the preparation of an electrophoretic device, electrophoretic displays comprising such particle, and new polymerisable dyes.

21 Claims, No Drawings

PARTICLES FOR ELECTROPHORETIC DISPLAYS

CROSS-REFERENCE TO RELATED APPLICATIONS

This application is a national stage application (under 35 U.S.C. §371) of PCT/EP2011/005936, filed Nov. 25, 2011, which claims benefit of European Application No. 10015121.6, filed Nov. 30, 2010 which are both incorporated by reference.

This invention relates to polymer particles, with surface functionality for charge retention, a process for their preparation, the use of these particles for the preparation of an electrophoretic device, colour electrophoretic displays comprising such particles, and new polymerisable dyes.

In recent years a need has developed for low power, low cost and light weight display devices. EPDs (Electrophoretic Displays) can fulfil this requirement. One use of EPDs is for electronic paper. It is imperative that once an image is displayed, the image can be retained for a long period of time without further voltage being applied. Hence, this fulfils the requirements of low power use, and means an image can be visible until another image is required.

An EPD generally comprises charged electrophoretic particles dispersed between two substrates, each comprising one or more electrodes. The space between the electrodes is filled with a dispersion medium which is a different colour from the colour of the particles, or substantially colourless. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels.

Available technologies of EPDs include electronic paper, commercially used in electronic books. This application uses black and white colour. The use of different coloured particles in a single pixel has been exemplified in recent patent literature (U.S. Pat. No. 7,304,634, GB 2 438 436, US 2007/0268244).

An important characteristic of particles intended for the use in an electrophoretic fluid is that the particles carry a charge. Only the charge will allow the particles to be moved under an electric field and hence enable the display pixel to be switched between two optical states. However, the task of inducing a charge into a particle in a low dielectric constant medium is not trivial. Nevertheless, methods to induce charging in low dielectric media are known. The traditional approach of creating charged species in low dielectric constant media is by the addition of surfactants that form micelles of sufficient size. It is believed that the charges on the particle are created by abstraction or addition of an ion or proton from the particle. The created charge is then contained in the core of the micelles and stabilised against recombination with the oppositely charged counterpart. The use of this charging method is well established. Surfactants are used in the petroleum industry to prevent flow induced charging in i.e. pipelines and re-fuelling tubes. Similarly, surfactants have also been used in toner formulations for printers and also in EPD fluids.

But the situation is further complicated in the development of real-life formulations for EPD applications. In many cases, at least two particle species are present in the formulation and sometimes even two different surfactants are used. A typical formulation will therefore consist of a complicated and dynamic set of interactions between the different particle surfaces, surfactants, and dispersion medium. Additionally, the equilibria may change under the influence of the electric field.

The lack of a reliable theoretical framework is a major challenge for developing high performance EPD fluids. A significant amount of trial and. error formulation work is required to obtain EPD fluids with certain desired properties. Alternatively, particles having a charge fixed to a polymeric shell are described in WO 2010/050949 and US 2005/0018273. However, these methods require good access to the particle surface, which may be blocked by a steric stabilisation layer, and availability of reactive groups, which may not be present.

There is a need for a simple preparation of charged particles which can be easily dispersed in non-polar media and show electrophoretic mobility.

The present invention provides particles for use in electrophoretic devices comprising monomer units of a) at least one polymerisable ionic liquid $X—R—C^+A^-$, wherein X is a polymerisable group, R is a spacer group, $C^+$ is a cation, and $A^-$ is an anion, b) at least one monomer, c) optionally at least one polymerisable dye, and d) optionally at least one crosslinking co-monomer, a process for the preparation of such polymer particles, the use of these particles for the preparation of an electrophoretic device, electrophoretic fluids and devices comprising such particles, and polymerisable dyes.

The present invention provides a simple one-step process to introduce charge into polymeric particles for EPD. These particles can be dispersed in a low dielectric constant medium, preferably hydrocarbons, most preferably dodecane. The particles containing polymerisable ionic liquid (PIL) functionality exhibited electrophoretic movement under the influence of an electric field. EPD particles according to the invention that are charged by the incorporation of polymerisable ionic liquids and are dispersed in hydrocarbons typically exhibit zeta potentials of more than 50 mV, or even more than 80 mV. This potential directly influences the velocity of the particle movement under the influence of the electric field and thus the display switching speed and performance.

The essential feature of the present polymer particles is a polymerisable ionic liquid $X—R—C^+A^-$ (PIL) comprised in the polymer backbone of the particles. The use of ionic liquids with polymerisable group enables the charge to become irreversibly chemically bound and well entangled in the polymer particle, thus avoiding the presence of this material in the dispersion medium. At the same time, the covalent bond of one part of the ionic liquid to the particle also clearly determines the sign of the particle charge. Thus, even two particle EPD fluids can easily be formulated. The incorporation of the polymerisable ionic liquid into the particles is based on stoichiometry rather than available surface area. As a result, a high degree of control of the particle charge monodispersity can be possible. The present concept allows influencing the particle charge by chemical means. An advantage may be in particular that the particle charge density can be increased above a level that can be achieved conventionally by addition of surfactants, which lacks control over the surface chemistry of the particle.

Further advantages of the polymer particles according to the invention may be, alone or in combination, control of particle size, monodisperse size distribution with a small diameter range, optical clarity and colour compatibility, solvent resistance, non-swelling nature when dispersed in EPD solvent media, high electrophoretic mobility in dielectric media, accurate zeta potential is possible, excellent switching behaviour, faster response times at comparable voltages, consistent surface properties, and/or good reproducibility, and/or densities close to that of the carrier fluid.

Advantageously, the polymerisable ionic liquid is covalently incorporated into the particle and disadvantages such as loss of charge magnitude, interaction of the ion pair with second particle species or shielding of the electric field by an ion pair when being dissolved in the dispersion medium do not arise. The sign and magnitude of the charge of the inventive particles can be easily adjusted. Additionally, designing of EPD fluids may be simplified by using these particles, for example reducing the number of additives required for an EPD formulation. A further advantage of the invention is that aspects of charging the particles and aspects of creating a background electrolyte in the formulation can be decoupled and can be tuned individually.

The term polymerisable ionic liquid (PIL) throughout this invention means an ionic liquid $C^+A^-$ with a polymerisable group attached to the cation via a spacer group.

The term ionic liquid refers to organic salts that usually have melting points below 373 K. Review articles on ionic liquids are, for example, R. Sheldon "Catalytic reactions in ionic liquids", *Chem. Commun.*, 2001, 2399-2407; M. J. Earle, K. R. Seddon "Ionic liquids. Green solvent for the future", *Pure Appl. Chem.*, 72 (2000), 1391-1398; P. Wasserscheid, W. Keim "Ionische Flüssigkeiten—neue Lösungen für die Übergangsmetallkatalyse" [Ionic Liquids—Novel Solutions for Transition-Metal Catalysis], *Angew. Chem.*, 112 (2000), 3926-3945; T. Welton "Room temperature ionic liquids. Solvents for synthesis and catalysis", *Chem. Rev.*, 92 (1999), 2071-2083 or R. Hagiwara, Ya. Ito "Room temperature ionic liquids of alkylimidazolium cations and fluoroanions", *J. Fluorine Chem.*, 105 (2000), 221-227.

Ionic liquid molecules provide soft, bulky ions that have the ability to dissociate in low dielectric constant liquids. In the present invention an ionic liquid is used where the cation is modified with a polymerisable group to incorporate soft, bulky ions in polymer particles. Preferably, the anion has a van der Waals volume of at least 80 $Å^3$. This polymerisable ionic liquid is then copolymerised during particle synthesis The polymerisable ionic liquids $X-R-C^+A^-$ according to the invention contain a polymerisable group X, a spacer group R, a cation $C^+$, and an anion $A^-$.

The polymerisable group X can be any polymerisable group like methacrylates, acrylates, methacrylamides, acrylonitriles, α-substituted acrylates, styrenes, vinyl, substituted vinyl. Especially preferred are methacrylates and acrylates.

The spacer group R can be an alkylene chain, polyether, poly-dialkylsiloxane. Spacer group R may be for example a group $-(A-B)_m-$ with A=linear or branched alkylene, preferably with 1 to 12 carbon atoms, especially with 1 to 4 carbon atoms, B=O or S, preferably O, and m=0 to 5, preferably 1 to 3. In particular, the spacer group R is a group $-(CH_2CHR-O)_m-$ with m=0 to 5, preferably 1 to 3, and R=H or $C_{1-4}$-alkyl, especially H or $CH_3$.

The cation $C^+$ can be an organic cation, such as, for example, a phosphonium, sulfonium, ammonium, uronium, thiouronium, guanidinium or heterocyclic cations such as imidazolium, pyridinium, pyrrolidinium, triazolium, morpholinium or piperidinium cation.

From the group of the ammonium, phosphonium or sulfonium cations, preference is given to the compounds of the formulae (1), (2) and (3):

$$[RNR'_3]^+ \quad (1),$$

$$[RPR'_3]^+ \quad (2),$$

$$[RSR'_2]^+ \quad (3),$$

where
R in each case denotes the spacer group,
R' in each case, independently of one another, denotes
a straight-chain or branched alkyl having 1-20 C atoms, which optionally can be partially fluorinated, but not in α-position to hetero-atom, and which can also include oxygen or/and sulfur atoms in any positions in between carbon atoms.
saturated, partially or fully unsaturated cycloalkyl having 5-7 C atoms, which may be substituted by alkyl groups having 1-6 C atoms.

Especially, cations are preferred where R' in each case stands for a straight-chain or branched alkyl having 4-20 C atoms, preferably 4-10 C atoms, From the group of heterocyclic cations, preference is given to the compounds selected from the group:

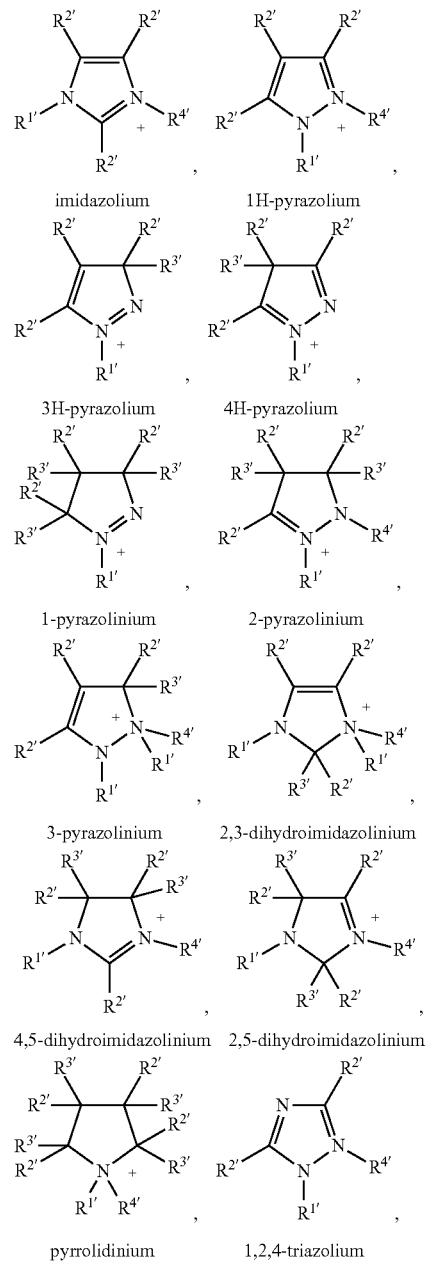

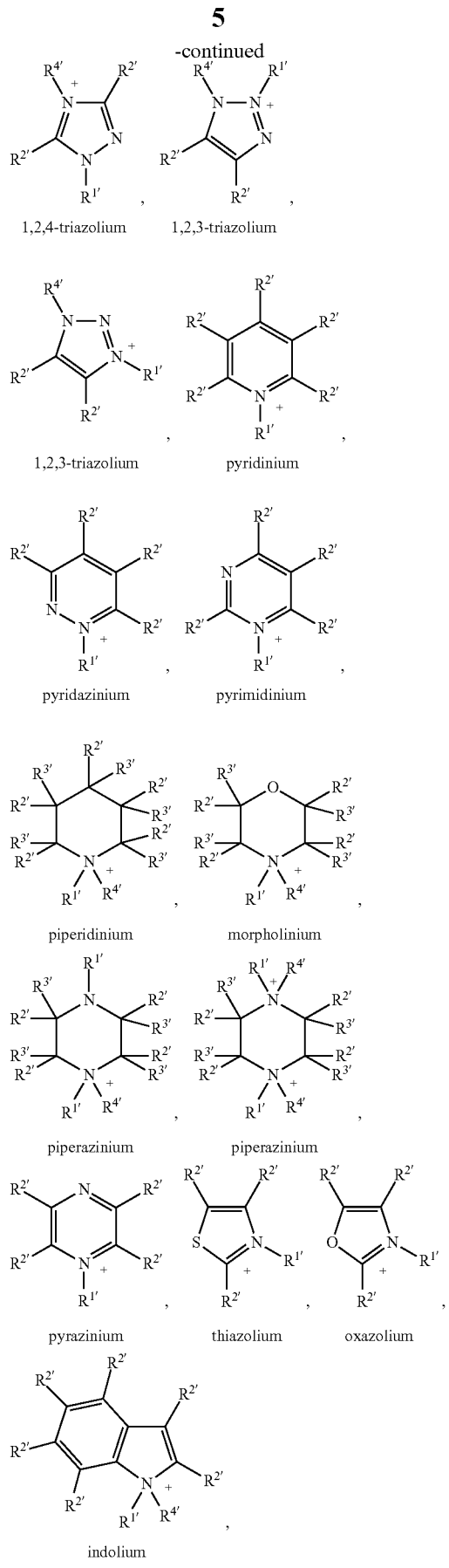

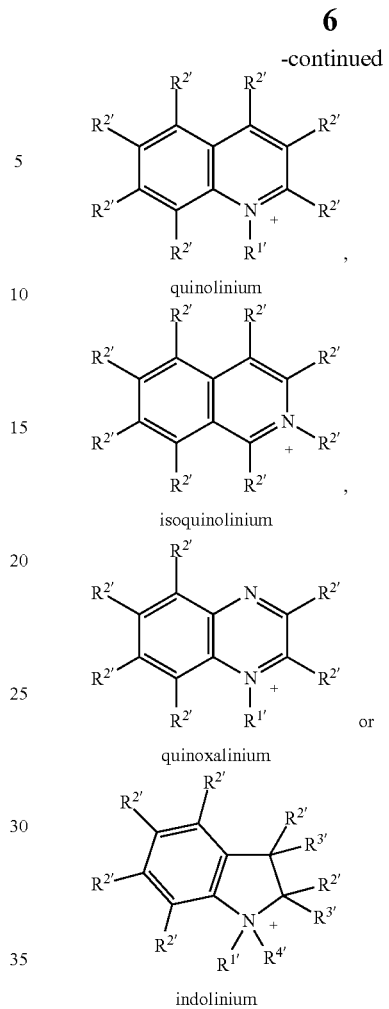

where the substituents
R[1'] to R[4'] each, independently of one another, denote
a straight-chain or branched alkyl having 1-20 C atoms, which optionally can be partially fluorinated, but not in α-position to hetero-atom, and which can also include oxygen or/and sulfur atoms in any positions in between carbon atoms.
saturated, partially or fully unsaturated cycloalkyl having 5-7 C atoms, which may be substituted by alkyl groups having 1-6 C atoms,
where the substituents R[1'], R[2'], R[3'] and/or R[4'] together may also form a ring system, and one of the substituent R[1'] to R[4'] stands for the spacer group R.

Preferably, the cation C[+] is a tetraalkylammonium, tetraalkylphosphonium, N-alkylpyridinium, N,N-dialkylpyrrolidinium, 1,3-dialkylimidazolium or trialkyl-sulfonium cation.

C[+] is preferably an alkyl substituted ammonium, pyridinium, pyrrolidinium or imidazolium group.

Especially, the following polymerisable cations X—R—C[+] are used:
N-[2-(methacryloyloxy)ethyl]-N,N,N-trialkylammonium
N-[2-(methacryloyloxy)ethyl]-N,N,N-trimethylammonium (MOTMA)
N-[2-(methacryloyloxy)propyl]-N,N,N-trimethylammonium
N-[2-(methacryloyloxy)ethyl]-N,N,N-trihexylammonium (MOTHA)

N-[2-(methacryloyloxy)propyl]-N,N,N-trihexylammonium
N-[(2-methacryloxy)-(AO)$_x$-A]-N,N,N-trialkylammonium
1-[2-(methacryloyloxy)ethyl]-3-butylimidazolium
1-(2-methacryloxyethyl)-3-methylimidazolium
1-[(2-methacryloxy)-(AO)$_x$-A]-3-methylimidazolium
1-[2-(methacryloyloxy)ethyl]-1-butylpyrrolidinium
1-(2-methacryloxyethyl)-1-methylpyrrolidinium
1-[(2-methacryloxy)-(AO)$_x$-A]-1-methylpyrrolidinium
wherein (AO)$_x$ is a polyalkyl oxide preferably with x=1-10, especially with x=2-4 and A especially=ethylene, propylene,
1-[(2-methacryloxy)-C$_y$]-3-methylimidazolium,
1-[(2-methacryloxy)-C$_y$]-1-methylpyrrolidinium,
wherein C$_y$ is an alkyl chain preferably with y=1 to 12, especially with y=1 to 4,
N-(acryloxy-ethyl)-N,N,N-trimethyl ammonium (AOTMA),
N-(acryloxy-ethyl)-N,N,N-trihexyl ammonium (AOTHA),
N-(acryloxy-propyl)-N,N,N-trihexyl ammonium
N-[3-(methacryloylamino)propyl]-N,N,N-trimethylammonium
N-[3-(methacryloylamino)propyl]-N,N,N-trihexylammonium
N,N,N-tetraallyl ammonium
1-allyl-3-methylimidazolium
1-allyl-1-methylpyrrolidinium
N-butyl-4-vinyl-pyridinium
N-ethyl-4-vinyl-pyridinium
N-methyl-4-vinyl-pyridinium
N-methyl-2-vinyl-pyridinium
N,N-diallyl-N,N-dimethyl ammonium
N-(vinylbenzyl)-N,N,N-trimethylammonium Particularly, N-[2-(methacryloyloxy)ethyl]-N,N,N-trimethylammonium (MOTMA) and N-[2-(methacryloyloxy)ethyl]-N,N,N-trihexylammonium (MOTHA) are preferred polymerisable cations.

The anion A⁻ can be a usually inorganic anion, such as, for example, a borate, imide, phosphate, sulfonate, sulfate, succinate, naphthenate or carboxylate.

Preferred anions A⁻ are:
tetrafluoroborate
tetracyanoborate (TCB)
difluoro-dicyano borate
fluoro-tricyano borate
perfluoroalkyl-fluoro-dicyano borate
pentafluoroethyl-fluoro-dicyano borate
perfluoroalkyl-difluoro-cyano borate
pentafluoroethyl-difluoro-cyano borate
perfluoroalkyl-fluoro borate (FAB)
perfluoroalkyl-alkoxy-dicyano borate
alkoxy-tricyano borate
methoxy-tricyano borate
ethoxy-tricyano borate
2,2,2-trifluoroethoxy-tricyano borate
bis(2,2,2-trifluoroethoxy)-dicyano borate
tetraphenylborate (TPB)
tetrakis(3,5-bis(trifluoromethyl)phenyl)borate (TFPB)
tetrakis(4-chlorophenyl)borate
tetrakis(4-fluorophenyl)borate
tetrakis(pentafluorophenyl)borate
tetrakis(2,2,2-trifluoroethoxy)borate
bis(oxalato)borate
bis(trifluoromethylsulfonyl)imide (NTF)
bis(fluorosulfonyl)imide
bis[bis(pentafluoroethyl)phosphinyl]imide (FPI)
tris(trifluoromethylsulfonyl)methide
(fluoroalkyl)fluorophosphate
tris(pentafluoroethyl)trifluorophosphate (FAP)
bis(pentafluoroethyl)tetrafluorophosphate
(pentafluoroethyl)pentafluorophosphate
tris(nonafluorobutyl)trifluorophosphate
bis(nonafluorobutyl)tetrafluorophosphate
(nonafluorobutyl)pentafluorophosphate
hexafluorophosphate
bis(fluoroalkyl)phosphinate
bis(pentafluoroethyl)phosphinate
bis(nonafluorobutyl)phosphinate
(fluoroalkyl)phosphonate
(pentafluoroethyl)phosphonate
(nonafluorobutyl)phosphonate
nonafluorobutane sulfonate (nonaflate) (NFS)
trifluoromethanesulfonate
trifluoroacetate
methanesulfonate
butanesulfonate
butylsulfate
hexylsulfate
octylsulfate
dicyanamide
tricyanomethide
thiocyanate
hydrogensulfate
trifluoroacetate
tosylate
docusates: (bis(2-2-ethyl hexyl) sulfosuccinate (AOT)
naphthenates
lauryl sulphate
alkyl benzene sulfonates (dodecyl benzene sulfonates, linear and branched,
alkyl naphthalene sulfonate)
alkyl aryl ether phosphates
alkyl ether phosphate
alkyl carboxylates: stearate, octoates, heptanoate Preferably, tetracyanoborate (TCB), tetraphenylborate (TPB), tetrakis(3,5-bis(trifluoromethyl)phenyl)borate (TFPB), bis(trifluoromethylsulfonyl)imide (NTF), tris(pentafluoroethyl)trifluorophosphate (FAP), bis[bis(pentafluoroethyl)phosphinyl]imide (FPI), nonafluorobutane sulfonate (nonaflate) (NFS), (bis(2-2-ethyl hexyl) sulfosuccinate (AOT), pentafluoroethyl-dicyano-fluoro borate, methoxy-tricyano borate, ethoxy-tricyano borate and 2,2,2-trifluoroethoxy-tricyano borate are used.

Preferred fluoroalkyl phosphate anions (FAP-anions) are [PF$_3$(C$_2$F$_5$)$_3$]⁻, [PF$_3$(C$_4$F$_9$)$_3$]⁻, [PF$_3$(C$_3$F$_7$)$_3$]⁻, [PF$_4$(C$_2$F$_5$)$_2$]⁻, [PF$_5$(C$_2$F$_5$)]⁻, Preferred fluoroalkyl-fluoro borate anions (FAB anions) are also [B(CF$_3$)$_4$]⁻, [B(C$_2$F$_5$)$_4$]⁻, [BF$_3$(CF$_3$)]⁻, [BF$_3$(C$_2$F$_5$)]⁻, [BF$_3$(i-C$_3$F$_7$)]⁻, [BF$_2$(CF$_3$)$_2$]⁻, [BF$_2$(C$_2$F$_5$)$_2$]⁻, [BF$_2$(CF$_3$)$_2$]⁻, [BF(C$_2$F$_5$)$_3$]⁻, [BF(CF$_3$)$_3$]⁻ oder [BF(CF$_3$)(C$_2$F$_5$)$_2$]⁻.

Particularly, tetraphenylborate (TPB), tetrakis(3,5-bis(trifluoromethyl)phenyl)borate (TFPB), and (bis(2-2-ethyl hexyl) sulfosuccinate (AOT) are preferred anions.

Examples of polymerisable ionic liquids preferably suitable for the invention are listed in Table 1.

TABLE 1

| Ref. | Polymerisable Cation | Anion |
|---|---|---|
| MOTMA-TFPB | methacryloyloxyethyl trimethylammonium | tetrakis[3,5-bis(trifluoromethyl)phenyl]borate |
| MOTHA-TFPB | methacryloyloxyethyl trihexylammonium | tetrakis[3,5-bis(trifluoromethyl)phenyl]borate |
| MOTHA-FAP | methacryloyloxyethyl trihexylammonium | tris(pentafluoroethyl)trifluorophosphate |
| MOTHA-NFS | methacryloyloxyethyl trihexylammonium | nonafluorobutanesulfonate |
| MOTHA-NTF | methacryloyloxyethyl trihexylammonium | bis(trifluoromethanesulfonyl)imide |
| MOTHA-TCB | methacryloyloxyethyl trihexylammonium | tetracyanoborate |
| MOTMA-AOT | methacryloyloxyethyl trimethylammonium | bis(2-ethylhexyl) sulfosuccinate |

Especially preferred are polymerisable ionic liquids comprising as cation N-[2-(methacryloyloxy)ethyl]-N,N,N-trimethylammonium (MOTMA), N-[2-(methacryloyloxy)propyl]-N,N,N-trimethylammonium, N-[2-(acryloyloxy)ethyl]-N,N,N-trimethylammonium (AOTMA), N-[2-(methacryloyloxy)ethyl]-N,N,N-trihexylammonium (MOTHA), N-[2-(methacryloyloxy)propyl]-N,N,N-trihexylammonium or N-[2-(acryloyloxy)ethyl]-N,N,N-trihexylammonium (AOTHA) and as anion tetraphenylborate, tetrakis (3,5-bis(trifluoromethyl)phenyl)borate or (bis(2-2-ethyl hexyl) sulfosuccinate. Especially preferred are the methacrylate compounds.

FIG. 1 shows by way of example of MOTMA the synthesis of polymerisable ionic liquids of the invention by ion exchange, which can be carried out under conditions known to the person skilled in the art.

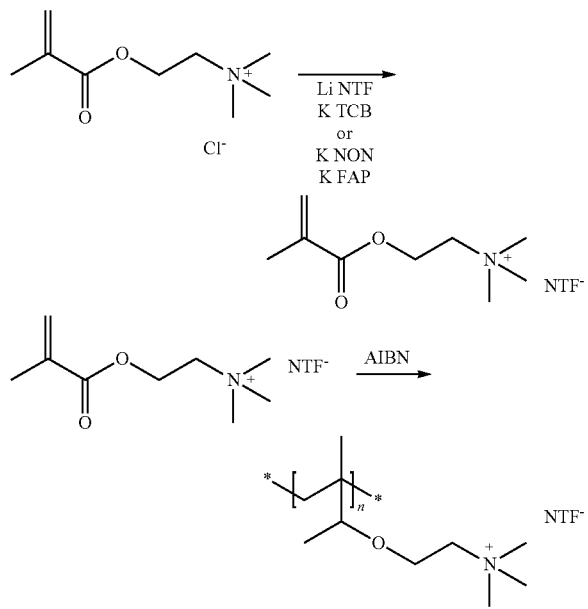

Equimolar ratios of polymerisable cations and salts comprising the desired anion are reacted; for example Li NTF or K FAP or K NFS or K TCB with MOTMA Cl or MOTHA Cl. The polymerisable ionic liquids can be polymerised as show in FIG. 1.

The salts of NTF, FAP, NFS, TCB or MOTMA are commercially available or can be synthesised by known methods, for example salts containing tetracyanoborate anions in accordance with the disclosure of WO 2004/072089.

The synthesis of several polymerisable ionic liquids is known from the literature. For example, the preparation of 1-allyl-3-methylimidazolium bis(pentafluoroethyl)phosphinate from tris(pentafluoroethyl)phosphine oxide, N-methylimidazole, and allyl alcohol is described in WO 2005/049555.

Fluoroalkylborate anions (FAB) and processes for their preparation are described in EP 1205480 and EP 1229038.

The preparation of further compounds according to the invention can be carried out analogously to the illustrative reactions shown above. The preparation of further compounds according to the invention can also be carried out by other methods known per se to the person skilled in the art from the literature. In particular, other catalysts can be used.

Usually, the polymer particles according to the invention comprise at least one polymerisable ionic liquid $X-R-C^+ A^-$, at least one monomer, optionally at least one polymerisable dye, and optionally at least one crosslinking co-monomer. Preferably, at least one, optionally polymerisable, steric stabiliser is comprised.

Preferably, the particles according to the invention comprise a polymerizable ionic liquid $X-R-C^+A^-$, at least one monomer, at least one polymerisable dye, and a steric stabiliser.

The polymer particles may have a homogeneous distribution of monomers and co-monomers or they may have a special distribution, for example for providing a core-shell effect so that there is more polymerisable ionic liquid on the shell of the particles. Particularly preferable are monomers which are similar to the polymerisable ionic liquid.

The particles can be prepared from most monomer types, in particular methacrylates, acrylates, acrylamides, methacrylamides, acrylonitriles, α-substituted acrylates, styrenes and vinyl ethers, vinyl esters, and propenyl ethers but would typically be prepared from largest percentage to be monomer, then cross-linker, and polymerisable ionic liquid.

The following are all examples which could be used and which are commercially available from the Sigma-Aldrich chemical company. Mixtures of monomers may also be used.
Methacrylates:

Methyl methacrylate (MMA), Ethyl methacrylate (EMA), n-Butyl methacrylate (BMA), 2-Aminoethyl methacrylate hydrochloride, Allyl methacrylate, Benzyl methacrylate, 2-Butoxyethyl methacrylate, 2-(tert-Butylamino)ethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, 2-(Diethylamino)ethyl methacrylate, Di(ethylene glycol) methyl ether methacrylate, 2-(Dimethylamino)ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxyethyl methacrylate, Hydroxypropyl methacrylate Mixture of hydroxypropyl and hydroxyisopropyl methacrylates, 2-Hydroxypropyl 2-(methacryloyloxy) ethyl phthalate, Isobornyl methacrylate, Isobutyl methacrylate, 2-Isocyanatoethyl methacrylate, Isodecyl methacrylate, Lauryl methacrylate, Methacryloyl chloride, Methacrylic acid, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl) propyl methacrylate, 3,3,5-Trimethylcyclohexyl methacrylate, Trimethylsilyl methacrylate, Vinyl methacrylate. Preferably Methyl methacrylate (MMA), Methacrylic acid, Ethyl methacrylate (EMA), and/or n-Butyl methacrylate (BMA) are used.
Acrylates:

Acrylic acid, 4-Acryloylmorpholine, [2-(Acryloyloxy) ethyl]trimethylammonium chloride, 2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, 2-(Diethylamino)ethyl acrylate, i(ethylene glycol) ethyl ether acrylate technical grade, Di(ethylene glycol) 2-ethylhexyl ether acrylate, 2-(Dimethylamino)ethyl acrylate, 3-(Dimethylamino)propyl acrylate, Dipentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol) methyl ether acrylate, Poly(propylene glycol) acrylate, Poly(propylene glycol) methyl ether acrylate Soybean oil, epoxidized acrylate, 3-Sulfopropyl acrylate potassium salt, Tetrahydrofurfuryl acrylate, 3-(Trimethoxysilyl)propyl acrylate, 3,5,5-Trimethylhexyl acrylate.

Preferably Methyl acrylate, acrylic acid, Ethyl acrylate (EMA), and/or n-Butyl acrylate (BMA) are used.
Acrylamides:
2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl)trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl)acrylamide, N-(Isobutoxymethyl)acrylamide, N-Isopropylacrylamide, N-Isopropylmethacrylamide, Methacrylamide, N-Phenylacrylamide, N-[Tris(hydroxymethyl)methyl]acrylamide,
Styrenes
Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene, N,N-Dimethylvinylbenzylamine, 2,4-Diphenyl-4-methyl-1-pentene, 4-Ethoxystyrene, 2-Fluorostyrene, 3-Fluorostyrene, 4-Fluorostyrene, 2-Isopropenylaniline, 3-Isopropenyl-α,α-dimethylbenzyl isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl)styrene, 4-(Trifluoromethyl)styrene, 2,4,6-Trimethylstyrene. Preferably Styrene and/or Divinyl benzene are used.
Vinyl Groups
3-Vinylaniline, 4-Vinylaniline, 4-Vinylpyridine, 4-Vinylanisole, 9-Vinylanthracene, 3-Vinylbenzoic acid, 4-Vinylbenzoic acid, Vinylbenzyl chloride, 4-Vinylbenzyl chloride, (Vinylbenzyl)trimethylammonium chloride, 4-Vinylbiphenyl, 2-Vinylnaphthalene, 2-Vinylpyridine, N-Vinyl-2-pyrrolidinone, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate, Other monomers which may be used are those which have groups to help stabilisation of the particles, e.g. Poly(ethylene glycol) methyl ether acrylate, Poly(ethylene glycol) phenyl ether acrylate, lauryl methacrylate, Poly(ethylene glycol) methyl ether acrylate, Poly(propylene glycol) methyl ether acrylate, Lauryl acrylate and fluorinated monomers of above.

Some of the monomers have groups for further reaction if so desired, e.g. Glycidyl ethacrylate, 2-Hydroxyethyl methacrylate.

The following compounds can be used as intraparticle crosslinking monomers for solubility control and solvent swelling resistance: ethylene glycol dimethacrylate (EGDMA), allyl methacrylate (ALMA), divinyl benzene, Bis[4-(vinyloxy)butyl]adipate, Bis[4-(vinyloxy)butyl]1,6-hexanediylbiscarbamate, Bis[4-(vinyloxy)butyl] isophthalate, Bis[4-(vinyloxy)butyl](methylenedi-4,1-phenylene)biscarbamate, Bis[4-(vinyloxy)butyl]succinate, Bis[4-(vinyloxy)butyl]terephthalate, Bis[4-(vinyloxymethyl)cyclohexylmethyl]glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol) divinyl ether, Di(ethylene glycol) vinyl ether, Ethylene glycol butyl vinyl ether, Ethylene glycol vinyl ether, Tris[4-(vinyloxy)butyl]trimellitate, 3-(Acryloyloxy)-2-hydroxypropyl methacrylate, Bis[2-(methacryloyloxy)ethyl] phosphate, Bisphenol A propoxylate diacrylate, 1,3-Butanediol diacrylate, 1,4-Butanediol diacrylate, 1,3-Butanediol dimethacrylate, 1,4-Butanediol dimethacrylate, N,N'-(1,2-Dihydroxyethylene)bisacrylamide, Di(trimethylolpropane) tetraacrylate, Diurethane dimethacrylate, N,N'-Ethylenebis(acrylamide), Glycerol 1,3-diglycerolate, Glycerol dimethacrylate, 1,6-Hexanediol diacrylate, 1,6-Hexanediol dimethacrylate, 1,6-Hexanediylbis[oxy(2-hydroxy-3,1-propanediyl)]bisacrylate, Hydroxypivalyl hydroxypivalate bis[6-(acryloyloxy)hexanoate], Neopentyl glycol diacrylate, Pentaerythritol diacrylate, Pentaerythritol tetraacrylate, Pentaerythritol triacrylate, Poly(propylene glycol) diacrylate, Poly(propylene glycol) dimethacrylate, 1,3,5-Triacryloylhexahydro-1,3,5-triazine, Tricyclo[5.2.1.0]decanedimethanol diacrylate, Trimethylolpropane benzoate diacrylate, Trimethyloipropane ethoxylate methyl ether diacrylate, Trimethyloipropane ethoxylate triacrylate, Trimethyloipropane triacrylate, Trimethylolpropane trimethacrylate, Tris[2-(acryloyloxy)ethyl] isocyanurate, Tri(propylene glycol) diacrylate.

Preferred monomers/co-monomers are methyl methacrylate and methacrylic acid.

In a preferred variant of the invention, the polymer particles comprise at least one polymerisable dye.

The function of the polymerisable dye is to colour the particle. The polymerisable dye consists of a chromophore, one or more polymerisable groups, optional linker groups (spacers), and optional groups to modify physical properties (like solubility, light fastness, etc.) and optionally charged group(s).

The polymerisable dye preferably comprises a chromophoric group and a functional group or plurality of functional groups selected from polymerisable groups, e.g. methacrylates, acrylates, methacrylamides, acrylonitriles, α-substituted acrylates, styrenes and vinyl ethers, vinyl esters, propenyl ethers, oxetanes and epoxys etc., in particular methacrylates and acrylates.

The polymerisable group may be attached directly to the chromophoric group or may be attached through a linker group. An example of a suitable linker group is an optionally substituted alkyl chain, a polyether alkyl chain, a cycloalkyl or aromatic ring, heteroaromatic ring or a combination thereof.

The chromophoric group preferably comprises of conjugated aromatic (including heteroaromatic) and/or multiple bonds including: azo (including monoazo, bisazo, trisazo, linked azos etc), metallised azo, anthraquinone, pyrroline, phthalocyanine, polymethine, aryl-carbonium, triphendioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups. Preferred chromophoric groups are azo groups (especially monoazo, and bisazo), anthraquinone and phthalocyanine groups.

Preferably the polymerisable dye comprises a chromophoric group and one or more functional groups selected from an acrylate or methacrylate backbone.

A polymerisable dye may contain a single chromophore, for example with bright yellow, magenta or cyan colours and self shade blacks. However, it may also contain mixed covalently attached chromophores for example to obtain a black colour, by covalently attached brown and blue or yellow, magenta and cyan. Green can be obtained by yellow and cyan etc. Extended conjugated chromophores can also be used to obtain some shades. For example, bis- and trisazo compounds can be used to obtain blacks and other duller shades (navy blue, brown, olive green, etc).

Mixtures of polymerisable dyes can also be used to obtain the correct particle shade; for example a black from single component mixtures of brown and blue or yellow, magenta and cyan pre-polymerised dyes. Similarly shades can be tuned for example by adding small quantities of separate polymerisable dyes to modify the colour of the particles (e.g. 95% yellow and 5% cyan to get a greener yellow shade).

Especially, the polymerisable dyes described in WO 2010/089057 and WO 2010/089060 are suitable for incorporation in the polymer particles of the invention. Preferably acrylate or methacrylate derivatives of Disperse red 1, dyes of Formula 1, especially methacrylate or acrylate derivative of cationic Basic Blue 41, and dyes of Formula 2, especially with R5 and R6=$CH_3$ and Hal=Cl, and dyes of Formula 3, especially with R7 and R8=$CH_3$ are used as polymerisable dyes for the invention.

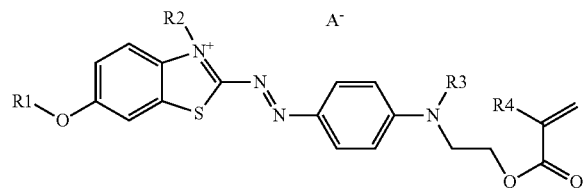

Formula 1 wherein R1,R2,R3=alkyl, preferably C1-C4 alkyl, R4=H or $CH_3$
$A^-$=halogen, monobasic acid (oxo) anions, preferably acetate, propionate, lactate, methane sulphonate, p-toluenesulphonate, hydroxide, or nitrate, preferably with R1,R2, R4=$CH_3$ and R3=$C_2H_5$ and $A^-$=methane sulfonate;

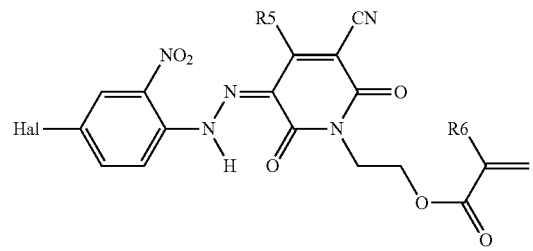

Formula 2 wherein R5=C1-C4 alkyl, preferably $CH_3$,
R6=H or CH3, preferably $CH_3$,
Hal=halogen, preferably Cl;

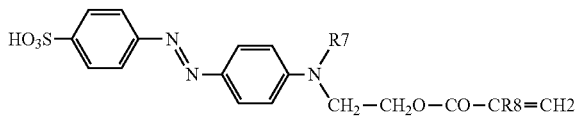

Formula 3 wherein R7=alkyl, preferably C1-C4 alkyl, especially $CH_3$,
R8=H or CH3, preferably $CH_3$.

Especially preferred are Disperse red 1 methacrylate, methacrylate derivative of cationic Basic Blue 41, and dye of Formula 3 with R7 and R8=$CH_3$. these dyes and their preparation are described in described in WO 2010/089057 and WO 2010/089060.

Besides the essential polymerisable ionic liquid and monomers and co-monomers as described in the foregoing, the polymer particles of the invention may preferably comprise a steric stabiliser to enhance the surface stabilisation or steric repulsions of the polymeric particles in a non-polar continuous phase. Preferably a non-aqueous dispersion (NAD) stabiliser is adsorbed on to the particle.

Suitable NAD stabilisers are block copolymers with a comb shape structure. Especially block copolymers with a molecular weight of approximately 10,000-100,000 can be used. The molecular weight ratio of the backbone to hairs may be approximately 1:1. The particle dispersion medium (non-polar solvent) preferably is a poor solvent for the backbone. The backbone chemistry preferably is similar to the particle. The length of the hairs preferably is of the order of the distance required to sterically stabilise the particles. The particle dispersion medium preferably is a good solvent for the hairs. It is possible to attach chromophores and/or charging groups to the backbone and or the hairs. NAD stabilisers are commercially available or can be prepared to known methods, e.g. as described in 'Dispersion Polymerization in Organic Media', ISBN 0471 054186, edited by K. E. J. Barrett, published by John Wiley and Sons, Copyright 1975, by Imperial Chemical Industries Ltd. Preferred NAD stabilisers are for example poly(hydroxystearic acid), and poly(hydroxystearic acid) graft (poly) methyl methacrylate and methacrylic acid copolymers, Solsperse 3000, Solsperse 11,200, Solsperse 13,300 and Solsperse 13,240 from Lubrizol Ltd., UK. Advantageously stabilisers comprising additionally copolymerised glycidyl methacrylate may be permanently locked in the polymer particle. This is simply done in the same vessel, by raising the temperature and adding diethanolamine. This opens up a glycidyl ring which is then available to polymerise with unreacted carboxylic acid groups from a methacrylic acid monomer.

Polymer particles prepared according to the invention are preferably spherical particles with a size (diameter) in the range of 50-1000 nm and preferably with a monodisperse size distribution. Preferred particle sizes are 50-600 nm, preferably 50-560 nm, especially 50-500 nm, even more preferred 100-400 nm. Especially preferred are particles having a particle size of 150-400 nm, especially 150-350 nm. Particle sizes are determined by photon correlation spectroscopy of particle dispersions by a common apparatus such as a Malvern NanoZS particle analyser or preferably by SEM (Scanning Electron Microscopy) and image analysis.

The size of polymer particles in electrophoretic fluids may be different from sizes measured in crude dispersions because of the influence of solvents and/or surfactants. In electrophoretic fluids, the polymer particles of the invention preferably have a particle size of 100-800 nm, especially 100-700 nm, preferably 150-700 nm are preferred. Especially preferred are polymer particles having a particle size of 150-600 nm.

The polymer particles of the invention can be prepared by copolymerisation in a non-aqueous, non-polar solvent, especially by copolymerisation of a polymerisable ionic liquid X—R—C$^+$A$^-$, at least one monomer, optionally at least one polymerisable dye, optionally at least one crosslinking co-monomer and an initiator.

Preferably, the polymer particles of the invention can be prepared in a simple 1-step reaction in a non-aqueous, preferably non-polar medium. The preferred solvents are non-polar hydrocarbon solvents, especially such used in EPD fluids, i.e. the Isopar series (Exxon-Mobil), Norpar, Shell-Sol (Shell), Sol-Trol (Shell), naphtha, and other petroleum solvents, as well as long chain alkanes such as hexane, heptanes, octane, dodecane, tetradecane, decane and nonane, hexadecane. Especially preferred is dodecane. Preferably the polymer particles are simply separated from the reaction suspension by filtration, preferably by pouring the suspension through a pore size filter, i.e. a 0.1 μm pore size filter, or the particles can be cleaned by centrifuging. Preferred is to maintain the particles dispersed during filtration by replacing the dispersion medium with fresh solvent.

The selection of the polymerisation conditions depends on the required size and size distribution of the particles. Adjustment of polymerisation conditions is well known to someone skilled in the art.

Preferably, a batch polymerisation process is used wherein all reactants are completely added at the outset of the polymerisation process. In such process only relatively few variables have to be adjusted for a given formulation. Preferred changes which can be made in such cases are to the reaction temperature, reactor design and the type and speed of stirring. Thus, a batch polymerisation process is used for manufacture versus a semi-continuous batch process because of limited versatility and simple evaluations of reaction formulation.

This route avoids the use of aqueous medium as previously reported for the syntheses of polymer particles for EPD. Whereas preparation in aqueous medium has obvious advantages in terms of health, safety and environmental terms, ultimately the polymer particles have to be redispersed in a non-aqueous, non-polar medium for use in EPD. If the particles are prepared in water, then usually a long and power consuming process such as freeze drying or spray drying is required to remove the water. This route avoids such time consuming steps and the polymer particles do not have to be redispersed in to a suitable non-polar solvent for EPD. This route also avoids introducing unwanted traces of water into the EPD dispersion. Therefore, this process provides a one-step reaction to prepare coloured particles suitable for EPD, without the requirement of freeze or spray drying enabling a cost effective production process. No transfer of solvents is required.

Preferably the polymerisation is a free radical polymerisation.

Usually, a monomer composition according to the invention comprises at least one polymerisable ionic liquid X—R—C$^+$A$^-$, at least one monomer, optionally at least one polymerisable dye, optionally at least one crosslinking co-monomer and an initiator in a non-aqueous solvent. Preferably, at least one, optionally polymerisable, steric stabiliser is added.

Preferably, a monomer composition according to the invention comprises a polymerizable ionic liquid X—R—C$^+$A$^-$, at least one monomer, at least one polymerisable dye, a steric stabiliser, an initiator, and a non-aqueous, non-polar solvent.

The monomers and co-monomers described in the foregoing for polymer particles composition can be used in the polymerisation process. Especially, the monomers and mono-mer/co-monomer compositions described as preferred examples are also preferred in the preferred polymerisation process.

The monomers and co-monomers for preparation of the polymeric particles can be combined with the polymerisable ionic liquids to produce a polymerisable ionic liquid/monomer mixture and/or the monomers can be incorporated stepwise into the polymerisable mixture to produce special effects, for example a core-shell effect so that there is more polymerisable ionic liquid on the shell of the particles. Particularly preferable are monomers which are similar to the polymerisable ionic liquid.

A preferred monomer composition comprises methyl methacrylate and optionally methacrylic acid. Preferred polymerisable dyes which may be used for preparation of polymer particles according to the invention have been described in the foregoing.

Especially preferred is a polymerisable composition comprising at least one of the preferred polymerisable ionic liquids in combination with methyl methacrylate and optionally methacrylic acid, and at least one of the preferred polymerisable dyes.

Advantageously, a steric stabiliser as described in the foregoing is added. Preferably a non-aqueous dispersion (NAD) stabiliser is used.

Preferably, an oil soluble initiator is used in the non-aqueous copolymerisation in order to control size, particle morphology and to reduce the residual monomers at the end of the reaction. Preferably an oil-soluble thermal initiator is added in step c) of the present process. Examples are 2,2'-Azobis(4-methoxy-2.4-dimethyl valeronitrile), 2,2'-Azobis(N-butyl-2-methylpropionamide), 2,2'-Azobis(2.4-dimethyl valeronitrile), Dimethyl 2,2'-azobis(2-methylpropionate), 2,2'-Azobis(2-methylbutyronitrile), also known as Vazo 67 (DuPont), 1,1'-Azobis(cyclohexane-1-carbonitrile), 2,2'-Azobis[N-(2-propenyl)-2-methylpropionamide], 1-[(1-cyano-1-methylethyl)azo]formamide, 2,2'-Azobis(N-cyclohexyl-2-methylpropionamide) (all available from Wako); Vazo 52 and Vazo 64 (available from DuPont), Luperox 331.

Preferably 2,2'-Azobis(2.4-dimethyl valeronitrile), Dimethyl 2,2'-azobis(2-methylpropionate), 2,2'-Azobis(2-methylbutyronitrile) or Vazo 67 are used.

The polymerizable composition of the invention preferably comprises 1-30%, preferably, 1-10%, by weight of polymerisable ionic liquid, 0.1-15, preferably 1-10%, by weight of a polymerisable dye, 50-95%, preferably 70-90%, by weight of monomer, 1-40%, preferably 1-10%, by weight of crosslinking monomer, and 0.1-10%, preferably 0.1-5%, by weight of initiator, all percentages are based on the total weight of the polymerizable composition (except solvent) and summarize to 100% in total.

Cross-linked copolymer nanoparticles can preferably be prepared by copolymerisation of polymerisable ionic liquid, methyl methacrylate (MMA), methacrylic acid, dye monomer, 1-octanethiol and NAD stabiliser using azobisisobutyronitrile (AIBN) or 2,2'-Azobis(2-methylbutyronitrile (Vazo 67) as an initiator. Preferably, polymerisations are conducted using a batch process.

Besides of incorporation of a polymerisable dye into the polymer particles of the invention, dying of polymer particles can also be achieved by colouring polymer particles with a dye or with a polymerisable dyes and subsequent polymerisation of the dye within the particles as described in WO 2009/100803 and WO 2010/089059.

The dyes can also be pre-polymerised before being used for colouring polymer particles as described in WO 2010/089058.

Particles of the invention are primarily designed for use in electrophoretic displays. So, further subjects of the invention are electrophoretic fluids and electrophoretic displays comprising a typical electrophoretic display which preferably consists of the particles dispersed in a low polar or non-polar solvent along with additives to improve electrophoretic properties, such as stability and charge. Examples of such electrophoretic dispersions are well described in the literature, for example U.S. Pat. No. 7,247,379; WO 99/10767; US 2007/0128352; U.S. Pat. Nos. 7,236,290; 7,170,670; 7,038,655; 7,277,218; 7,226,550; 7,110,162; 6,956,690; 7,052,766; 6,194,488; 5,783,614; 5,403,518; 5,380,362.

Typical additives to improve the stability of the electrophoretic fluid are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (Aldrich).

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5cst), low water solubility, a high boiling point (>80° C.) and a refractive index and density similar to that of the particles. Tweaking these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), and dodecane (Sigma Aldrich)

Usually electrophoretic fluids comprise a charged inorganic particle such as titania, alumina or barium sulphate, coated with a surface layer to promote good dispersibility in dielectric media and a dielectric fluid media. Furthermore, the coloured particles of the present invention may be used in combination with white reflective polymer particles prepared by a process comprising the steps of a) forming a reverse emulsion comprising at least one polymer, at least one white reflective particle, at least one polar solvent, at least one non-polar solvent, and at least one surfactant and b) removing the polar solvent or polar solvents by evaporative methods. "Reverse emulsion" means that a non-polar solvent (preferably dodecane, or comparable aliphatic hydrocarbons)) forms the continuous phase and a polar solvent (preferably water) forms the discontinuous phase. Such process is also called either "evaporative precipitation" or "reverse emulsion solvent removal" (RESR) due to the steps involved in forming a reverse emulsion and then removing the solvent from the internal phase by evaporative methods to form a solid particle.

The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767) and WO 2005/017046). The Electrophoretic fluid is then incorporated into an Electrophoretic display element by a variety of pixel architectures, such as can be found in C. M. Lampert, Displays; 2004, 25(5) published by Elsevier B. V., Amsterdam.

The Electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic particles according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B. V., Amsterdam. Examples of flexible displays are dynamic keypads, e-paper watches, dynamic pricing and advertising, e-readers, rollable displays, smart card media, product packaging, mobile phones, lab tops, display card, digital signage.

The disclosures in the cited references are thus expressly also part of the disclosure content of the present application.

The following examples explain the present invention in greater detail without restricting the scope of protection.

EXAMPLES

The characterisation of the formulations was performed using a Malvern NanoZS particle analyser unless otherwise stated. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications. Samples for the analysis are prepared from PIL containing particle dispersions with known particle weight content. These dispersions are purified by centrifugation and subsequent redispersion in pure dodecane. The samples are prepared by diluting the particles with dodecane to a concentration where particle scattering in the dispersion is just noticeable to the naked eye. This approach is a standard method for light scattering experiments and known to a person skilled in the art. When using additives, surfactants are added at a concentration so that the ratio of particles to surfactant is either 3:5 or 1:1 by weight.

The electrophoretic mobility of the particles is measured using a Zetasizer Nano ZS (Malvern Instruments Ltd. U.K.). In this method two electrodes are submersed into the sample (Universal Dip Cell: ZEN1002) and a sinusoidal AC at 30V is applied. The electric field causes charged particles to move towards the electrode of opposite charge.

A laser beam (4 mW He—Ne, 633 nm) is shown through the electrodes and the scattered laser light is recorded by a detector (Avalanche photodiode, Q.E>50% at 633 nm). Particles that are moving in the electric field introduce a frequency shift into the laser signal. The frequency shift is extracted by overlaying the scattered light with incident light (heterodyning method). The frequency shift is then used to determine the electrophoretic mobility of the particles.

NAD stabiliser 30% by weight in dodecane was obtained from ICI Ltd. precipitated in cold methanol, dried and dissolved in a 50:50 mixture of ethyl acetate (Aldrich) and butyl acetate (Aldrich). All materials other than polymerisable ionic liquids are commercially available: sodium tetrakis[3,5-bis(trifluoromethyl)phenyl]borate (Merck), 2-methacryloyloxy ethyl trimethylammonium chloride, 80% aqueous solution (Aldrich), sodium bis(2-ethylhexyl) sulfosuccinate (Fluka), methyl methacrylate (Aldrich), Vazo 67 (DuPont), DCM (Aldrich), dodecane (Aldrich), NAD stabiliser (ICI), tri(n-hexyl)amine (Aldrich), 3-bromo-1-propanol (Aldrich), methylacryloyl chloride (Aldrich), triethylamine (Aldrich), methanol (VWR), tetrahydrofuran (Aldrich), methyl acrylic acid (Aldrich), 2,2-azo-bis-isobutyronitrile (Aldrich), poly (12-hydroxy stearic acid)-poly(methyl methacrylate)copolymer [P(HAS-co-MMA)], octanethiol (Aldrich)

List Of Abbreviations
STFPB Sodium tetrakis[3,5-bis(trifluoromethyl)phenyl]borate
MOTAC 2-methacryloyloxy ethyl trimethylammonium chloride
AOT sodium bis(2-ethylhexyl) sulfosuccinate
DCM dichloromethane
MOTMA TFPB 2-methacryloyloxy ethyl trimethylammonium tetrakis[3,5-bis(trifluoromethyl)phenyl]borate
MOTMA AOT 2-methacryloyloxy ethyl trimethylammonium bis(2-ethylhexyl) sulfosuccinate

Example 1

Synthesis of 2-methacryloyloxy ethyl trimethylammonium tetrakis[3,5-bis(trifluoromethyl)phenyl]borate (MOTMA TFPB)

0.5 g Sodium tetrakis[3,5-bis(trifluoromethyl)phenyl]borate (STFPB) are dispersed in 13 g of DCM. 0.156 g MOTAC (75% in water) is diluted with 11.356 g water. The two phases are combined and shaken. After phase separation the DCM phase is transparent. The DCM phase is separated and washed once with fresh water. Subsequently the DCM is evaporated and the 2-methacryloyloxy ethyl trimethylammonium (tetrakis[3,5-bis(trifluoromethyl)phenyl]borate is collected

Example 2

Preparation of Polymer Particles Incorporating PIL of Example 1 by Dispersion Polymerisation Methyl methacrylate (23.0 g) and NAD stabiliser (3.83 g) are weighed out into a 100 ml 3-necked flask equipped with a condenser, nitrogen flow, and an overhead stirrer. MOTMA TFPB (0.42 g, 1.8 weight %) is added and stirred for 1 minute to facilitate dissolution of the PIL. Dodecane (25.08 g) is added to the reaction flask. The mixture is heated with stirring, once the temperature in the flask is at 70° C., Vazo 67 (0.20 g) is added and the reaction is stirred for at least 2 hours.

The resulting solution is filtered through 50 micron cloth. The particles are cleaned using a centrifuge. Centrifugations are carried out at a relative centrifugal force of 22 000 rpm for 20 minutes each, replacing the supernatant with dodecane two times.

The particles show an average particle size of 881 nm and a ZP of +96 mV.

Example 3

Synthesis of 2-methacryloyloxy ethyl trimethylammonium bis(2-ethylhexyl) sulfosuccinate (MOTMA AOT)

1 g Sodium bis(2-ethylhexyl) sulfosuccinate are dispersed in 10 g of DCM. 0.623 g of [2-(Methacryloyloxy)ethyl]trimethylammonium chloride (MOTAC) (75% in water) is diluted with 10.0 g water. The two phases are combined and shaken. A stable emulsion is formed which is broken by centrifugation (10,000 rpm for 1 hour). After phase separation the DCM phase is transparent and is separated and washed twice with fresh water (phase separation is induced by centrifugation as described above). Subsequently the DCM is evaporated and the 2-methacryloyloxy ethyl trimethylammonium bis(2-ethylhexyl) sulfosuccinate is collected.

Example 4

Preparation of Polymer Particles Incorporating PIL of Example 3 by Dispersion Polymerisation Methyl methacrylate (23.0 g) and NAD stabiliser (3.83 g) are weighed out into a 100 ml 3-necked flask equipped with a condenser, nitrogen flow, and an overhead stirrer. MOTMA AOT (0.46 g, 2.0 weight %) is added and stirred for 1 minute to facilitate dissolution of the PIL. Dodecane (25.08 g) is added to the reaction flask. The mixture is heated with stirring, once the temperature in the flask is at 70° C., Vazo 67 (0.20 g) is added and the reaction is stirred for at least 2 hours.

The resulting solution is filtered through 50 micron cloth. The particles are cleaned using a centrifuge. Centrifugations are carried out at a relative centrifugal force of 22 000 rpm for 20 minutes each, replacing the supernatant with dodecane two times.

The particles show an average particle size of 732 nm and a ZP of +103 mV.

Example 5

Preparation of Hydroxyethyl(tri-n-hexyl)ammonium FAP

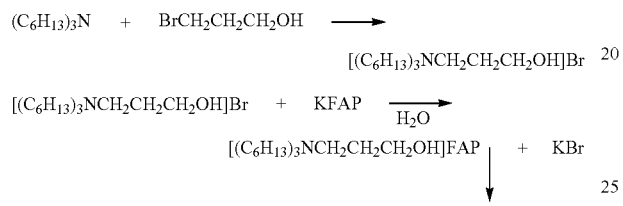

3.00 g (0.11 mol) tri-n-hexylamine is added to 3.09 g (0.22 mol) 3-bromopropanol and the solution is heated to 100° C. under vigorous stirring for 3 hours. After cooling to room temperature the resulting pale blue solution of n-hydroxyethyl(trihexyl)ammonium bromide in the excess of 3-bromopropanol is added to the solution of 5.39 (0.11 mol) potassium tris(pentafluoroethyl)trifluorophosphate (KFAP) in 30 ml water. After 20 min stirring at room temperature the bottom phase is separated and washed five times with 20 ml of water. The liquid product is dried at 0.01 mbar and 25° C. for 4 h. Yield of nearly colourless viscous Hydroxyethyl(tri-n-hexyl)ammonium FAP is 7.8 g (0.10 mol, 92%). The product is identified and characterized by $^1$H, $^{19}$F and $^{31}$P NMR spectroscopy.

Example 6

Preparation of N-[2-(Methacryloyloxy)propyl]-N,N,N-tri-n-hexylammonium FAP

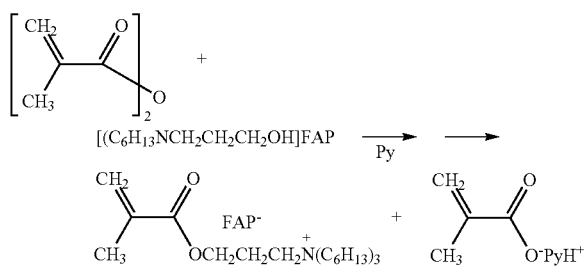

154 mg (1.00 mmol) methacrylic acid anhydride is added to the mixture of 774 mg (1.00 mmol) hydroxyethyl(tri-n-hexyl)ammonium FAP and 79 mg (1.00 mmol) pyridine under stirring at 20° C. Reaction mixture is left stirred for 20 hours at room temperature and after that diluted with ice-water. The bottom phase is separated and washed three times with 5 ml of water. The liquid product is dried at 0.01 mbar and 25° C. for 5 h. The product is characterized by $^1$H, $^{19}$F and $^{31}$P NMR spectroscopy.

Example 7

Preparation of N-[2-(Methacryloyloxy)ethyl]-N-methyl(2-oxoimidazolidinium-1-yl) FAP

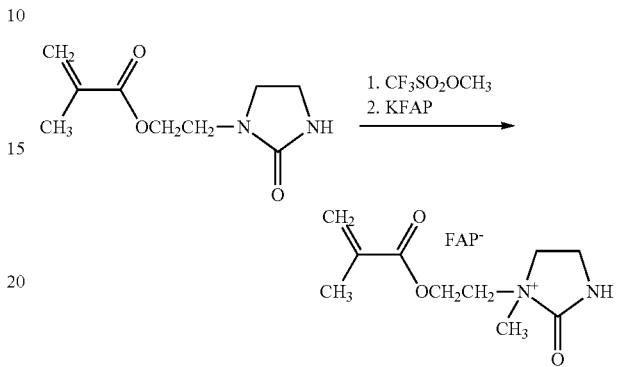

164 mg (1.00 mmol) of freshly distilled methyltrifluoromethanesulfonate is added to a solution of 198 mg (1.00 mmol) methacrylic-acid-[2-(2-oxoimidazolidine-1-yl)ethyl-ester in 594 mg of methacrylic acid methylester under vigorous stirring at 0° C. After 20 min at ° C. the solvent, methacrylic acid methylester, is pumped off at 0.01 mbar and 0° C. within 4 h. 362 mg (1.00 mmol) of N-[2-(Methacryloyloxy)ethyl]-N-methyl(2-oxoimidazolidinium-1-yl)trifluoromethanesulfonate (viscous liquid) remains in the flask. To this residue the solution of 484 mg (1.00 mmol) potassium FAP in 4 ml water is added at room temperature. After 20 min stirring the bottom phase is separated and washed five times with 4 ml water. The product is dried at 0.01 mbar and 25° C. for 4 h. 526 mg (80% yield) of highly viscous light brown liquid is isolated. The product, N-[2-(methacryloyloxy)-ethyl]-N-methyl(2-oxoimidazolidinium-1-yl) FAP is characterized by $^1$H, $^{19}$F and $^{31}$P NMR spectroscopy.

Example 8

Synthesis of 2-methacryloyloxy propyl trihexylammonium tetrakis[3,5-bis(trifluoromethyl)phenyl]borate by a Three-Step Procedure In step 1, 1 mole equivalent of tri(n-hexyl)amine and 0.9 mole equivalents of 3-bromo-1-propanol are refluxed at 110° C. for five days. Conditions are chosen to yield almost complete reaction of the added of 3-bromo-1-propanol. The reaction mixture is used without further purification in the next step.

Step 2 is carried out under nitrogen in an ice bath. Methyl acryloyl chloride is used as received without removal of inhibitor. 5 ml dichloromethane (dried with molecular sieves), three mole equivalents of methyl acryloyl chloride and 2.5 mole equivalents of triethylamine are used per mole of the quaternary ammonium salt formed in Step 1. The reaction mixture is reacted for 19 hours with vigorous stirring under nitrogen. After completion, dichloromethane is removed by evaporation and replaced with ice-cold methanol. Deionised water at 4° C. is added drop-wise until precipitation is observed. 1H-NMR and 13C-NMR confirmed the presence of methacrylates.

In step 3, equivalent amounts of brominated monomer and NaTFPB are reacted in 1000 g of ice-cold methanol for 20 hours, without stirring. To enhance NaBr solubility and product precipitation, twice as much cold water as methanol by volume is added to the mixture gradually by melting frozen deionised water over the mixture. The products are left undisturbed in the ice bath for about an hour during which time it separates into two layers. The lower layer is diluted in 3 times its own volume of dry, ice-cold, filtered tetrahydrofuran (THF), in which it readily dissolves. The THF is removed by slow evaporation and the product is stored in a freezer prior to its use in particle synthesis.

Example 9

Preparation of Polymer Particles Incorporating PIL of Example 8 by Dispersion Polymerisation Methyl methacrylate (31.9 g), methyl acrylic acid (0.65 g), 2,2-azo-bis-isobutyronitrile (0.26 g), poly(12-hydroxy stearic acid)-poly(methyl methacrylate)copolymer [P(HAS-co-MMA)] (1.63 g), octanethiol (0.16 g), and MOTMA TFPB (0.91 g, 1.4 weight %) are dissolved in a mixture of hexane (20.3 g) and n-dodecane (10.1 g) in a 250 ml 3-necked flask and refluxed under nitrogen at 80° C. for two hours.

The mixture is heated at 120° C. for 20 hours in the presence of 0.2 weight % of diethylamine. After completion, the reaction mixture is cooled, filtered through tightly packed glass wool, and washed by centrifugation. The supernatant is replaced with n-dodecane (dried with molecular sieves). The process of centrifugation and redispersion is repeated at least three times. The particles show an average particle size of 870 nm and a ZP of +50 mV.

The invention claimed is:

1. Polymer particles comprising monomer units of a) at least one polymerizable ionic liquid which has a melting point below 373 K and is of the formula

X—R—C$^+$A$^-$, wherein
X is a polymerizable group,
R is a spacer group,
C$^+$ is a cation, and
A$^-$ is a borate, imide, phosphate, sulfonate, succinate, naphthenate or carboxylate;
b) at least one monomer,
c) optionally at least one polymerizable dye, and
d) optionally at least one crosslinking co-monomer.

2. The polymer particles according to claim 1, wherein X is a methacrylate, acrylate, methacrylamide, acrylonitrile, α-substituted acrylate, styrene, vinyl or substituted vinyl group.

3. The polymer particles according to claim 1, wherein X is a methacrylate or acrylate group.

4. The polymer particles according to claim 1, wherein R is an alkyl, polyether or polydimethylsiloxane group.

5. The polymer particles according to claim 1, wherein C$^+$ is a phosphonium, sulfonium, oxonium, ammonium, uronium, thiouronium, imidazolium, pyridinium, pyrrolidinium, triazolium, morpholinium or piperidinium cation.

6. The polymer particles according to claim 1, wherein C$^+$ is an alkyl substituted ammonium, imidazolium, pyridinium or pyrrolidinium group.

7. The polymer particles according to claim 3, wherein R is an alkyl, polyether or polydimethylsiloxane group,
C$^+$ is an alkyl substituted ammonium, imidazolium, pyridinium or pyrrolidinium group and A$^{31}$ is tetrakis[3,5-bis(trifluoromethyl)phenyl]borate or (bis(2-2-ethyl hexyl) sulfosuccinate.

8. The polymer particles according to claim 1, wherein A$^{31}$ is tetrakis[3,5-bis(trifluoromethyl)phenyl]borate or (bis(2-2-ethyl hexyl) sulfosuccinate.

9. The polymer particles according to claim 1, wherein the polymerizable ionic liquid comprises (2-(methacryloyloxy) ethyl) triethylammonium, (2-(methacryloyloxy) ethyl) trihexylammonium, 1-[2-methacryloyloxy) ethyl]-3-butylimidazolium or 1-(2-methacryloxyethyl)-3-methylimidazolium.

10. The polymer particles according to claim 1, wherein a polymerizable stabilizer is incorporated.

11. The polymer particles according to claim 1, wherein the polymerizable dye is present and comprises azo dyes, metallized dyes, anthraquinone dyes, phthalocyanine dyes, benzodifuranones dyes, Brilliant Blue derivatives, pyrroline dyes, squarilium dyes, triphendioxazine dyes or mixtures of these dyes.

12. The polymer particles according to claim 1, wherein the polymerizable dye is present and comprises monoazo dyes, disazo dyes, and/or metallized azo dyes.

13. The polymer particles according to claim 1, wherein the polymer particles have a diameter of 50 -1000 nm.

14. The polymer particles according to claim 1, wherein the polymer particles have a diameter of 150 -600 nm.

15. A process for the preparation of the polymer particles according to claim 1, comprising
I) polymerizing
a) at least one polymerizable ionic liquid which has a melting point below 373 K and is of the formula

X—R—C$^+$A$^-$, wherein
X is a polymerizable group,
R is a spacer group,
C$^+$ is a cation, and
A$^-$ is a borate, imide, phosphate, sulfonate, succinate, naphthenate or carboxylate;
b) at least one monomer,
c) optionally at least one polymerizable dye,
d) at least one initiator, and
e) optionally at least one crosslinking co-monomer by dispersion polymerization, and
II) optionally washing and drying the polymer particles.

16. An electrophoretic fluid comprising polymer the particles according to claim 1.

17. An electrophoretic display device comprising the electrophoretic fluid according to claim 16.

18. A mono, bi or polychromal electrophoretic device comprising the polymer particles according to claim 1.

19. The electrophoretic display device according to claim 17, wherein the electrophoretic fluid is applied by a technique selected from inkjet printing, slot die spraying, nozzle spraying, and flexographic printing, or any other contact or contactless printing or deposition technique.

20. An electrophoretic device which comprises the polymer particles according to claim 1.

21. The polymer particles according to claim 1, wherein A is tetracyanoborate (TCB), tetraphenylborate (TPB), tetrakis (3,5-bis(trifluoromethyl)phenyl)borate (TFPB), bis(trifluoromethylsulfonyl)imide (NTF), tris(pentafluoroethyl)trifluorophosphate (FAP), bis[bis(pentafluoroethyl)phosphinyl] imide (FPI), nonafluorobutane sulfonate (nonaflate) (NFS), (bis(2-2-ethyl hexyl) sulfosuccinate (AOT), pentafluoroethyl-dicyano-fluoro borate, methoxy-tricyano borate, ethoxy-tricyano borate, 2,2,2-trifluoroethoxy-tricyano borate, [PF$_3$(C$_2$F$_5$)$_3$]$^-$, [PF$_3$(C$_4$F$_9$)$_3$]$^-$, [PF$_3$(C$_3$F$_7$)$_3$]$^-$, [PF$_4$(C$_2$F$_5$)$_2$]$^-$, $[PF_5(C_2F_5)]^-$, $[B(CF_3)_4]^-$, $[B(C_2F_5)_4]^-$, $[BF_3(CF_3)]^-$, $[BF_3(C_2F_5)]^-$, $[BF_3(i\text{-}C_3F_7)]^-$, $[BF_2(CF_3)_2]^-$, $[BF_2(C_2F_5)_2]^-$, $[BF_2(CF_3)_2]^-$, $[BF(C_2F_5)_3]^-$, $[BF(CF_3)_3]^-$, or $[BF(CF_3)(C_2F_5)_2]^-$.

* * * * *